United States Patent [19]

Darius

[11] Patent Number: 5,561,333

[45] Date of Patent: Oct. 1, 1996

[54] METHOD AND APPARATUS FOR REDUCING THE INTENSITY OF MAGNETIC FIELD EMISSIONS FROM VIDEO DISPLAY UNITS

[75] Inventor: Ivan H. Darius, Richardson, Tex.

[73] Assignee: MTI, Inc., Dallas, Tex.

[21] Appl. No.: 306,139

[22] Filed: Sep. 14, 1994

Related U.S. Application Data

[63] Continuation-in-part of Ser. No. 60,274, May 10, 1993, abandoned.

[51] Int. Cl.⁶ .................................................... H01J 29/06
[52] U.S. Cl. .................................................. 307/91; 315/8
[58] Field of Search ...................... 307/89, 91, 326–328; 315/8, 85; 361/143, 146, 149, 150, 159, 267; 174/35 R, 35 MS

[56] References Cited

U.S. PATENT DOCUMENTS

| | | |
|---|---|---|
| 2,994,803 | 8/1961 | Goldberg . |
| 3,322,998 | 5/1967 | Norley ........................................ 315/8 |
| 3,340,443 | 9/1967 | Rieth et al. . |
| 3,399,325 | 8/1968 | Teodor et al. . |
| 3,466,499 | 9/1969 | Beth . |
| 3,735,193 | 5/1973 | Ikeuchi . |
| 3,879,633 | 4/1975 | Stark, Jr. . |
| 3,887,833 | 6/1975 | Yamazaki ..................................... 315/8 |
| 3,947,632 | 3/1976 | Giger et al. . |
| 4,380,716 | 4/1983 | Romeo et al. .............................. 315/8 |
| 4,634,930 | 1/1987 | Toshiyasu et al. . |
| 4,636,911 | 1/1987 | Truskalo . |
| 4,661,856 | 4/1987 | Schnack ............................. 174/35 MS |
| 4,709,220 | 11/1987 | Sakane et al. . |
| 4,899,082 | 2/1990 | Sands et al. ................................. 315/8 |
| 4,914,350 | 4/1990 | Bosch et al. . |
| 4,922,153 | 5/1990 | Kevius ........................................ 315/85 |
| 4,922,167 | 5/1990 | Sluyterman et al. . |
| 4,947,083 | 8/1990 | Bosch et al. . |
| 4,950,955 | 8/1990 | Hoover et al. ............................... 315/8 |
| 4,963,789 | 10/1990 | Buhler ........................................ 315/8 |
| 4,996,461 | 2/1991 | Bentley ...................................... 315/8 |
| 5,017,832 | 5/1991 | Takita ........................................ 315/8 |
| 5,066,891 | 11/1991 | Harrold et al. .............................. 315/8 |
| 5,101,139 | 3/1992 | Lechter . |
| 5,107,179 | 4/1992 | Vidovich .................................... 315/8 |
| 5,122,619 | 6/1992 | Dlubak ................................. 174/35 MS |
| 5,151,635 | 9/1992 | Cappels . |
| 5,198,729 | 3/1993 | Powell . |
| 5,235,243 | 8/1993 | Tong ................................... 174/35 MS |
| 5,260,626 | 11/1993 | Takase et al. . |
| 5,350,973 | 9/1994 | Yokota et al. .............................. 315/8 |

FOREIGN PATENT DOCUMENTS

| | | |
|---|---|---|
| 0220777 | 6/1987 | European Pat. Off. . |
| 0523741A1 | 1/1993 | European Pat. Off. . |
| 0547856A1 | 6/1993 | European Pat. Off. . |
| 92263 | 12/1978 | Japan . |
| 197198 | 11/1984 | Japan . |
| 224299 | 4/1987 | Japan . |

OTHER PUBLICATIONS

Test Methods For Visual Display Units; MPR 1990:8—1990–12–01; pp. 1–66.
User's Handbook For Evaluating Visual Display Units; SWEDAC MPR 1990:10—1990–12–31; pp. 1–59.
*Programmable Very Low Frequency Magnetic Compensation for Displays*, IBM Technical Disclosure Bulletin, Jul. 1989, pp. 440–441, vol. 32 No. 2.

*Primary Examiner*—William M. Shoop, Jr.
*Assistant Examiner*—Richard T. Elms
*Attorney, Agent, or Firm*—Haynes and Boone, L.L.P.; Jeffrey M. Becker

[57] ABSTRACT

Method and apparatus for the reduction of the intensity of magnetic field emissions from video display units (VDU) in the vicinity of the user comprising a wire coil shaped to mimic the shape of conventional VDU deflection coils draped over a VDU to produce a cancelling magnetic field synchronous with the magnetic field produced by the unit's deflection coil. The cancellation coil is driven by a signature sensor disposed forward of the deflection coil that senses the characteristics of the magnetic field produced by the deflection coil. The gain of the cancellation coil is adjusted to maximize the cancellation coil's cancellation effect in the vicinity of the VDU user.

5 Claims, 3 Drawing Sheets

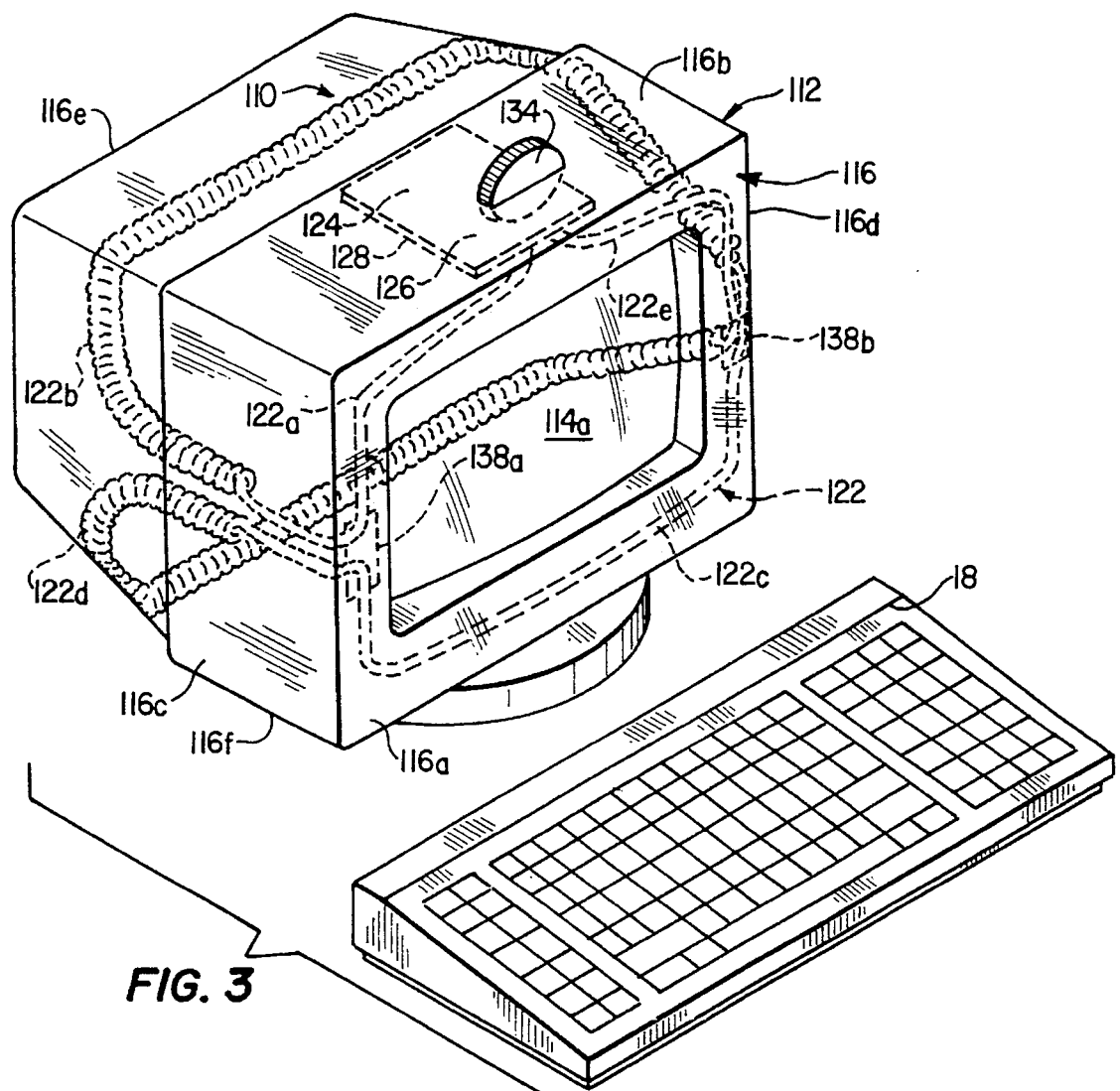
FIG. 3
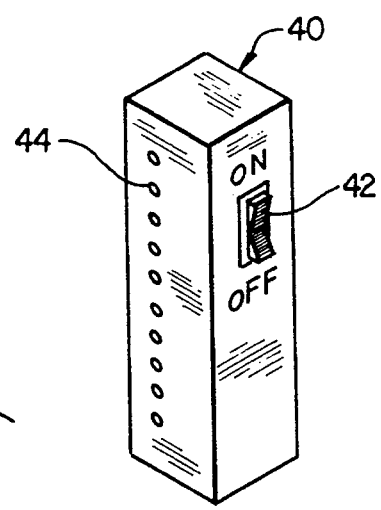

METHOD AND APPARATUS FOR REDUCING THE INTENSITY OF MAGNETIC FIELD EMISSIONS FROM VIDEO DISPLAY UNITS

CROSS REFERENCE TO CO-PENDING APPLICATION

This application is a continuation-in-part of application Ser. No. 08/060,274 filed on May 10, 1993, now abandoned.

FIELD OF THE INVENTION

The present invention relates to methods and apparatus for reducing the intensity of the magnetic field emitted from various magnetic field emitting devices and specifically video display units. More particularly, the present invention relates to an active magnetic field cancellation circuit disposed about a video display unit for reducing the intensity of the unit's magnetic field emissions in the vicinity of the user.

BACKGROUND OF THE INVENTION

Electrical devices generate and emit electro-magnetic radiation/fields (EMF's) into their immediate vicinity. Such radiation not only interferes with the performance of other nearby electrical devices, but also creates harmful biological effects in humans. Realizing the potential dangers of this radiation exposure, governments, universities and corporations have undertaken numerous studies to establish the causal links between EMF exposure and certain forms of cancer and other diseases, as well as to establish guidelines for safe exposure levels.

Due to the ever expanding use of personal computers in our society and their close proximity to their users, EMF emissions from computer video display units such as CRT's, LCD's and gas discharge displays have been extensively studied. These studies have led, in countries like Sweden and France, to legislation requiring certain EMF emitting devices such as video display units to limit radiation emissions in the vicinity of the user. Sweden, for example, now requires video display units to meet what is known as the MPR II standard for EMF emissions. Even in the absence of specific legislation, video display unit manufacturers are now voluntarily designing future units to meet or exceed the MPR II standard; however, the vast majority of video display units in worldwide use today and the majority of the ones currently being sold do not meet this standard.

Video display units are a major emitter of EMF's due their use of electron beams, electrostatic fields and/or magnetic fields that are used to display graphic images, information and data. For example, CRT's employ a deflection coil to magnetically deflect an electron beam (or raster) carrying the signal of the information or picture to be displayed toward the CRT's fluorescent screen. However, the magnetic field created by the deflection coil passes through the CRT's housing and screen, thereby creating harmful EMF emissions in the vicinity of the user.

Since the strength of a magnetic field decreases with distance, it has been suggested that the harmful biological effects of the magnetic field emitted from video display units could be avoided by maintaining an adequate, safe distance from such units, such as one meter. Also, as the harmful effects of magnetic fields increase with exposure, it has been suggested that the harmful effects can be reduced by turning off the video display unit when not in use.

Unfortunately, many video display units must be in use for substantial lengths of time making it unfeasible to reduce emissions by turning off the device. Further, due to the small character size displayed on most of such units, it is impractical to maintain an adequate safe distance from the unit.

In addition to the magnetic fields emitted from video display units, there exist ambient magnetic fields produced by the earth and other electrical devices. These ambient magnetic fields can interfere with the proper operation of the above-mentioned video display units by altering the color display and shifting the raster beam.

Numerous techniques have been developed to block the introduction of external ambient magnetic fields into video display units to prevent interference with their normal operation. However, such magnetic cancellation devices tend to increase the total magnetic field emitted from the unit, thereby increasing the interference with other devices in the vicinity and increasing the harmful biological effects caused by the magnetic field emissions. For example, U.S. Pat. No. 5,066,891 to Harrold et al. discloses a magnetic field sensing and cancelling circuit for use with a CRT which comprises a closed loop system of flux gate sensors to measure external magnetic fields and magnetic field cancellation coils disposed around the perimeter of the face plate of the CRT to cancel the measured field within the CRT housing. In this manner, color and positional image distortion of the CRT is minimized. The cancellation coils, however, create a net positive magnetic field outside of the CRT housing, thereby increasing the magnetic field emissions directed at the user.

What is needed is an apparatus and method to reduce, in the vicinity of the user, the intensity of the magnetic field emitted from video display units that can be easily retrofitted to existing units without distorting the unit's color and positional images.

SUMMARY OF THE INVENTION

The methods and apparatus of the present invention for reducing the intensity, in the vicinity of the user, of the magnetic field emitted from video display units (VDU's) avoid and overcome the above-mentioned disadvantages and drawbacks characteristic of the prior art and achieve a technical advance.

According to the present invention and in a departure from the prior art, a wire coil shaped to mimic the shape of conventional VDU deflection coils is draped over a VDU to produce a cancelling magnetic field synchronous with the magnetic field produced by the unit's deflection coil. This cancellation coil is driven by a signature sensor disposed forward of the deflection coil that senses the characteristics of the magnetic field produced by the deflection coil. The gain of the cancellation coil is adjusted to maximize the cancellation coil's cancellation effect in the vicinity of the VDU user.

In a preferred embodiment, a single cancellation coil is provided comprised of approximately 12–15 turns of low resistance wire and shaped to form two quasi-half coils that creates a cancelling magnetic field outside of the VDU similar in shape to the magnetic field generated by conventional deflection coils. The cancellation coil is driven by a signature sensor and electronics mounted within an electronics housing resting on the top panel of the VDU. Prior to driving the cancellation coil, the gain of the output signal from the signature sensor is adjusted by an adjustment knob extending through the electronics housing for manual engagement.

The cancellation coil is maintained on the VDU by a generally rectangular frame secured to and extending downwardly from the electronics housing and adjacent to the front bezel of the VDU. A channel formed within the frame acts to secure the cancellation coil to the frame. More particularly, a first segment of the cancellation coil electrically connected to the electronics extends from the electronics housing and is press-fit into a portion of the channel. The first segment of the cancellation coil extends around the upper left quadrant of the front bezel of the VDU and at the vertical midpoint of the screen, turns toward the back panel of the VDU housing passing through a coupling positioned along the side of the VDU.

A second segment of the cancellation coil extends from the first segment as it leaves the coupling and is coiled in the fashion of a telephone handset cord. The second segment extends over the top panel of the VDU to the VDU's other side where it connects to a third segment of the cancellation coil through another coupling. The third segment extends from near the vertical midpoint of the screen and travels around the bottom half of the front bezel within the channel formed within the frame. At the vertical midpoint of the screen, the third segment turns toward the back panel of the VDU and passes through the coupling to orient a portion of the third segment into a generally horizontal position parallel to the corresponding portion of the first segment.

A fourth segment of the cancellation coil extends from the third segment as it leaves the coupling and is also coiled in the fashion of a telephone handset cord. The fourth segment extends under the bottom panel of the VDU to the VDU's other side where it connects to a fifth segment of the cancellation coil through the coupling. The fifth segment extends from near the vertical midpoint of the screen, crosses over (or under) the third segment of the cancellation coil and travels around the upper right quadrant of the front bezel of the VDU. The fifth segment extends into the electronics housing and is electrically connected to the electronics to complete the electrical circuit of the cancellation coil. The resulting cancellation coil creates the effect of two half coils disposed around the screen to produce a magnetic field capable of minimizing the magnetic field emitted by the deflection coil within the VDU in the vicinity of the user.

In a preferred embodiment, the emission reduction apparatus further includes an emission sensor that measures the magnetic field strength in its immediate vicinity. The emission sensor houses a wire coil similar to the signature sensor to detect the presence and strength of any local magnetic fields. The emission sensor contains a magnetic field strength indicator to indicate the strength of any measured magnetic fields. Disposing the emission sensor in the vicinity of the user provides the necessary feedback for adjusting the gain of the cancelling magnetic field via the adjustment knob for enabling a maximum reduction of magnetic field strength in the user's vicinity.

The invention results in several technical advantages. Generally, the invention safeguards users of video display units from magnetic field emissions. More particularly, by focusing not on the magnetic field emissions at the video display unit, but on the strength of such emissions in the vicinity of the user, the present invention enables safe emission levels to be experienced by the user without adversely affecting the operating characteristics of the unit.

A further technical advantage is the ability of the present invention to reduce magnetic field emissions from video display units having different magnetic field emissions and different physical geometries.

A further technical advantage is the ability of the present invention to automatically adjust the field characteristics of the cancellation field to match changes in the characteristics of the magnetic field emitted by the deflection coil.

A further technical advantage is the ability of the present invention to provide a solution to video display unit magnetic field emissions that is easy to apply and retrofit to existing units, and that does not require the installation of any components within the unit housing.

A further technical advantage is the ability of the present invention to recognize the existence of other magnetic fields in the vicinity of the video display unit user and incorporate the existence of those fields in calculating the strength of the necessary cancellation field.

A further technical advantage is the ability of the present invention to be manually adjustable to ensure proper cancellation as the distance between the video display unit and its user changes or as other magnetic field producing devices enter the vicinity.

BRIEF DESCRIPTION OF THE DRAWINGS

The present invention may be better understood, and its numerous objects, features and advantages will become apparent to those skilled in the art, by reference to the accompanying drawings in which:

FIG. 3 is a perspective view of a video display unit showing a second embodiment of the present invention installed therein.

DESCRIPTION OF THE PREFERRED EMBODIMENTS

Figure 1:
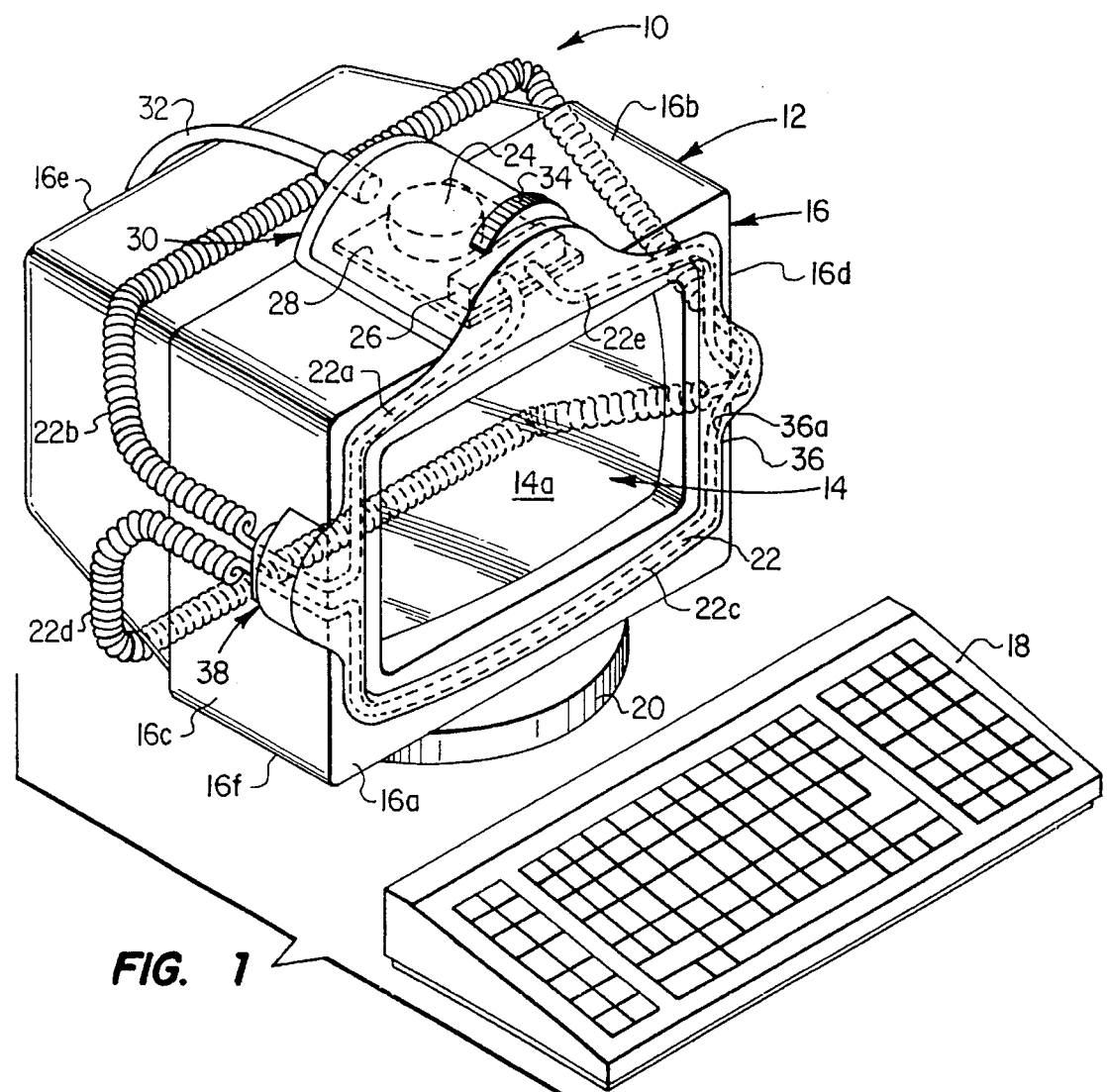
FIG. 1 is a perspective view of a video display unit showing the apparatus of the present invention installed thereon.
Figure 1:
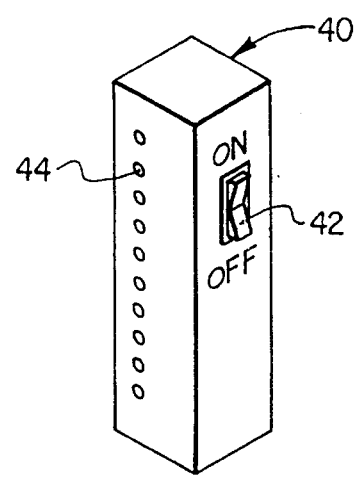

Referring now to the drawings and particularly to FIG. 1, the reference numeral 10 designates an apparatus embodying features of the present invention installed on a video display unit (VDU) 12. The VDU 12 is representative of a standard personal computer VDU that includes a cathode ray tube (CRT) 14 having a screen 14a contained in a housing 16 and that is controlled by a user via a keyboard 18. The VDU housing 16 includes a rectangular front bezel 16a defining an opening for receiving the screen 14a, a top panel 16b, side panels 16c and 16d, a back panel 16e and a bottom panel 16f. The VDU housing 16 rests upon an adjustable base 20 connected to and extending downwardly from the bottom panel 16f for enabling the user to orient the screen 14a to an optimal viewing position.

Contained within the CRT 14 is a conventional deflection coil (not shown) that creates a magnetic field for magnetically deflecting an electron beam (or raster) carrying the signal of the information or picture to be displayed by the VDU 12 toward the screen 14a. Such conventional deflection coils have a knotted cone shape that produces a complex magnetic field for deflecting the raster in the appropriate direction. The magnetic field produced by the deflection coil passes through the VDU housing 16 and screen 14a, thereby disposing harmful magnetic field emissions in the vicinity of the user.

To reduce the intensity of the magnetic field emitted by the deflection coil of the CRT 14, the apparatus 10 of the present invention includes a single cancellation coil 22 for producing a synchronous but opposing magnetic field in the vicinity of the user. The cancellation coil 22 is preferably comprised of approximately 12–15 turns of low resistance wire and resembles a conventional deflection coil in that it creates two quasi-half coils as described below.

The cancellation coil 22 is driven by a signature sensor 24 and electronics 26 mounted to a printed circuit board 28, all contained within an electronics housing 30. The electronics housing 30 is cylindrically-dome shaped and has a flat bottom for resting on the top panel 16b of the VDU housing 16 and for being secured thereto in any conventional manner. A power cord 32 extends from the electronics housing 30 for supplying power to the electrical components of the emission reduction apparatus 10. It should be understood that the electronics 26 could be housed in a compartment separate from the electronics housing 30 and apart from the signature sensor 24.

The signature sensor 24 is a wire coil having either an air core or one composed of a high permeable material for sensing the magnetic field emitted by the deflection coil (not shown) of the VDU 12 and determining the field's frequency and shape, or signature characteristics. Preferably, the signature sensor 24 has an air core to prevent the sensor from sensing any interfering magnetic fields that could be caused by a ferrite core or other high permeable material. Alternatively, the signature sensor 24 can be printed entirely on the printed circuit board 28. The output of the signature sensor 24 is passed through conventional electronics 26 that filter, integrate, phase shift and amplify the signal as is known in the art. Prior to driving the cancellation coil 22, the gain of the output signal from the signature sensor 24 is adjusted by an adjustment knob 34 extending through the electronics housing 30 for manual engagement.

The cancellation coil 22 is maintained on the VDU 12 by means of a generally rectangular frame 36 secured to and extending downwardly from the electronics housing 30. Both the frame 36 and the electronics housing 30 are preferably formed of plastic and can be molded as a single piece. The frame 36 is disposed adjacent to the front bezel 16a of the VDU housing 16 and similarly surrounds the screen 14a. A channel 36a formed within the frame 36 acts to secure the cancellation coil 22 to the frame 36. More particularly, a first segment 22a of the cancellation coil 22 electrically connected to the electronics 26 extends from the electronics housing 30 and is press-fit into a portion of the channel 36a, or otherwise conventionally secured to the frame 36. When viewing the screen 14a, the first segment 22a of the cancellation coil 22 extends around the upper left quadrant of the front bezel 16a of the VDU housing 16. At the vertical midpoint of the screen 14a, the first segment 22a turns toward the back panel 16e of the VDU housing 16 and passes through a coupling 38 attached to the frame 36 that secures a portion of the first segment 22a into a generally horizontal position along the side 16c of the VDU housing 16.

A second segment 22b of the cancellation coil 22 extends from the first segment 22a as it leaves the coupling 38 and is coiled in the fashion of a telephone handset cord for reasons described below. The second segment 22b extends along the side 16c, then over the top panel 16b of the VDU housing 16 to the side 16d where it connects to a third segment 22c of the cancellation coil 22 through a coupling (not shown) attached to the frame 36 and similar to the coupling 38. The coupling (not shown) travels along the side 16d of the VDU housing 16 at the vertical midpoint of the screen 14a. The third segment 22c extends from the side 16d near the vertical midpoint of the screen 14a and travels around the bottom half of the front bezel 16a within the channel 36a formed within the frame 36. At the vertical midpoint of the screen 14a, the third segment 22c turns toward the back panel 16e of the VDU housing 16 and passes through the coupling 38 to orient a portion of the third segment into a generally horizontal position along the side 16c of the VDU housing 16 and parallel to the corresponding portion of the first segment 22a.

A fourth segment 22d of the cancellation coil 22 extends from the third segment 22c as it leaves the coupling 38 and is also coiled in the fashion of a telephone handset cord as is the second segment 22b. The fourth segment 22b extends along the side 16c, then under the bottom panel 16f of the VDU housing 16 to the side 16d where it connects to a fifth segment 22e of the cancellation coil 22 through the coupling (not shown) that extends along the side 16d of the VDU housing 16 at the vertical midpoint of the screen 14a. The fifth segment 22e extends from the side 16d near the vertical midpoint of the screen 14a, crosses over (or under) the third segment 22c of the cancellation coil 22 and travels around the upper right quadrant of the front bezel 16a of the VDU housing 16 as viewed when looking at the screen 14a. The fifth segment 22e extends into the electronics housing 30 and is electrically connected to the electronics 26 to complete the electrical circuit of the cancellation coil 22.

The resulting cancellation coil 22 creates the effect of two half-coils disposed around the screen 14a to produce a magnetic field capable of minimizing the magnetic field emitted by the deflection coil (not shown) of the CRT 14, the top half-coil comprised of the first and fifth segments 22a and 22e of the cancellation coil 22 and the bottom half-coil comprised of the third segment 22c. Although the cancellation coil 22 has been described as consisting of various segments, of which the second and fourth segments 22b and 22d are coiled while the others are not, it should be understood that the cancellation coil 22 consists of a single wire coil and that the use of coil segments to describe the path of the cancellation coil 22 is simply to facilitate its description. It will be recognized by those skilled in the art that the cancellation coil 22 can be alternatively configured from two separate wire coils placed in series or parallel, each comprising one of the two half-coils discussed above, to create an essentially identical cancelling magnetic field.

In one preferred embodiment of the present invention, the emission reduction apparatus 10 further includes an emission sensor 40 that measures the magnetic field strength in its immediate vicinity. The emission sensor 40 houses a wire coil (not shown) similar to the signature sensor 24 to detect the presence and strength of any local magnetic fields and a conventional power source, such as a battery, controlled by a push button or ON/OFF switch 42. The emission sensor 40 contains a magnetic field strength indicator to indicate the strength of any measured magnetic fields, such as an LED display 44.

In operation, the emission reduction apparatus 10 of the present invention is secured to the VDU 12 by first resting the electronics housing 30 on the top panel 16b of the VDU housing 16 such that the frame 16 extends downwardly around the screen 14a of the CRT 14. The second and fourth segments 22b and 22d of the cancellation coil 22 are then stretched around the VDU housing 16, over the top panel 16b and the bottom panel 16f, respectively, which secures the emission reduction apparatus 10 to the VDU 12 due to the spring-like nature of such cancellation coil segments. It is understood that the emission reduction apparatus 10 could be further secured to the VDU 12 in other conventional manners.

When the CRT 14 is activated by turning on the VDU 12, the deflection coil (not shown) contained within the VDU emits a magnetic field detected by the signature sensor 24. The signature of the magnetic field is passed through the electronics 26 to the cancellation coil 22, the first, third and fifth segments of which (22a, 22c and 22e) generate a cancelling magnetic field in the vicinity of the user that is synchronous with but opposite to the magnetic field emitted by the deflection coil. Cancellation coil segments 22b and 22d, because they are coiled, emit little or no magnetic field beyond their respective circumferences.

To determine if the strength of the cancelling magnetic field generated by the cancellation coil 22 is appropriate to minimize the magnetic field emitted by the deflection coil in the vicinity of the user, the emission sensor 40 is activated by switching on the ON/OFF switch 42 and disposing the emission sensor 40 adjacent the user. The LED display 44 indicates the level of the resulting magnetic field at the user's location. The adjustment knob 34 is then used to adjust the gain of the cancelling magnetic field to effectively counteract and cancel the magnetic field emitted by the deflection coil. The proper setting of the adjustment knob 34 is reached when the LED display 44 indicates a minimal magnetic field strength. After this initial setting of the adjustment knob 34, no further gain adjustments are necessary, and thus the emission sensor 40 is no longer needed unless the VDU 12 is replaced or the distance between the screen 14a and the user changes. Any subsequent changes in the strength of the magnetic field emitted by the deflection coil during operation of the VDU 12 are automatically compensated for by the signature sensor 24 in a conventional manner.

EXAMPLE I

A test of the emission reduction apparatus 10 of the present invention was conducted using the video display units listed in Table I below. The magnetic fields emitted by the various VDU's were measured both before and after activation of the emission reduction apparatus 10 as the magnitude of the field including all three directional components. The magnetic fields were measured in front of each VDU at a distance of 50 cm (pursuant to the MPR II standard), and an array of 10×9 measurements on a 2" square grid were taken to check overall cancellation effect. Note that the units in the table are not in Tesla but are arbitrary units for comparison purposes only. The magnetic field values were measured in three (x,y,z) directions, and then the magnitude of the field was calculated as the square root of $x^2+y^2+z^2$.

The test shows that the emission reduction apparatus 10 significantly reduces the magnetic field emissions of the various tested VDU's in the vicinity of the user, namely 50 cm from the VDU. The apparatus 10 placed all of the VDU's in MPR II compliance with reductions in the magnetic field in the vicinity of the user ranging from 89.7% to 93.7% of the respective uncancelled fields. Even the VDU in MPR II compliance prior to activation of the emission reduction apparatus 10 experienced an additional 89.7% reduction upon activation of the present invention. The test results are tabulated below:

TABLE I

| Terminal | MPR II Compliant before cancellation | Average Magnetic Radiation level (at 50 cm) without cancellation | Average Magnetic Radiation level (at 50 cm) after cancellation | Percent Reduction of Magnetic Radiation due to cancellation | Maximum Magnetic Radiation spot before cancellation | Maximum Magnetic Radiation spot after cancellation | MPR II* Compliant, for Magnetic Radiation after cancellation |
|---|---|---|---|---|---|---|---|
| CTX 15" (reference) | Yes | 0.084 | 0.0098 | 89.7% | 0.114 | 0.017 | Yes |
| NEC 3FGe with FG Monitor Lens | Not specified | 0.039 | 0.0026 | 93.7% | 0.055 | 0.003 | Yes |
| Leading Technology LT1451V | No | 0.329 | 0.027 | 92.2% | 0.393 | 0.036 | Yes |
| DELL Ultrascan 15" | No | 0.593 | 0.054 | 91.2% | 0.693 | 0.07 | Yes |
| Orchestra 14" | No | 0.749 | 0.061 | 92.1% | 0.858 | 0.083 | Yes |

Figure 2:
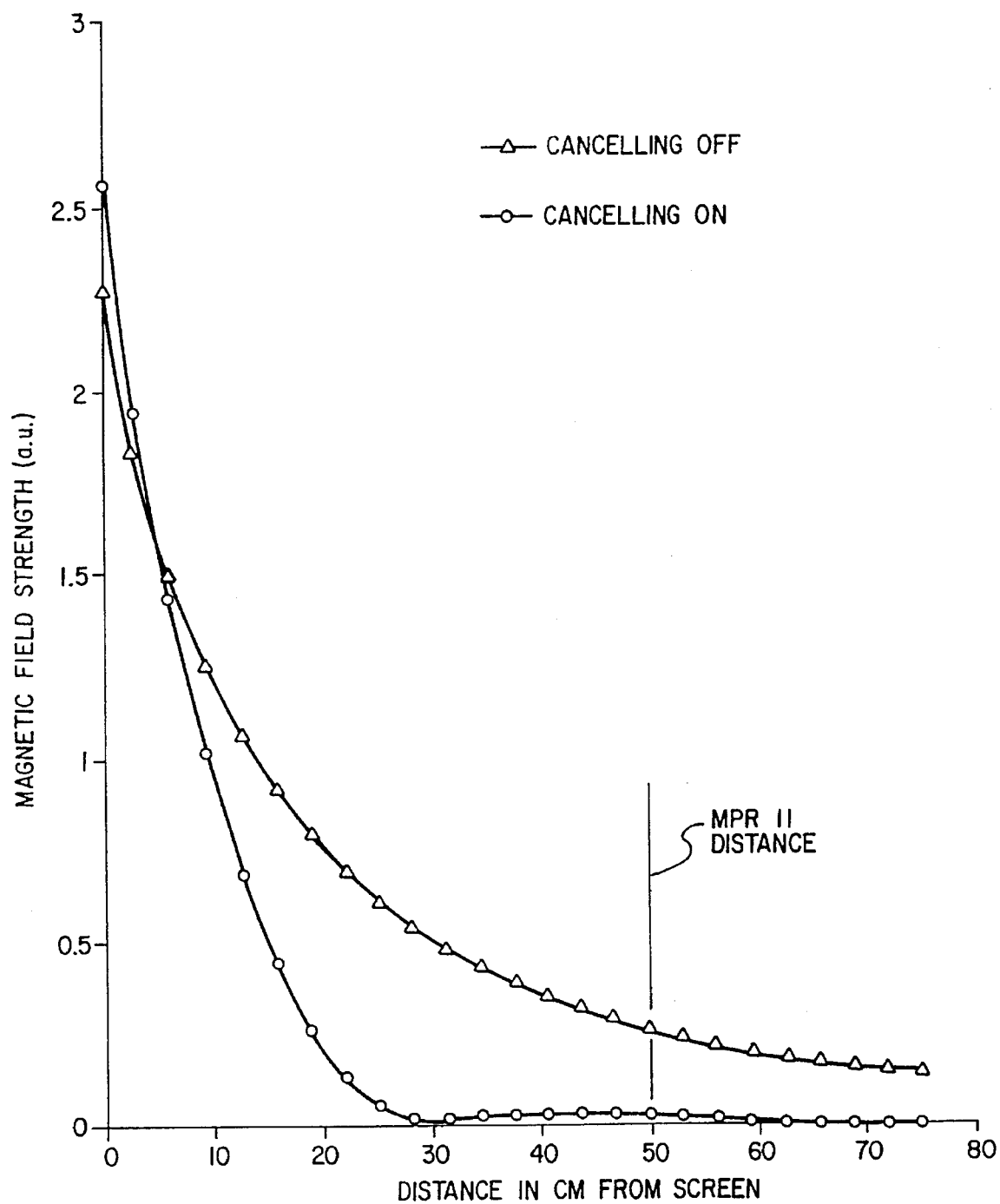
FIG. 2 is a graph showing the cancellation effect of the present invention.

*MPR II compliance here is interpreted as better than the compliant CTX 15" monitor A graphical representation of the minimizing effect of the emission reduction apparatus 10 on magnetic fields emitted by a hypothetical VDU theoretically based on the results of the above example is shown in FIG. 2. The graph plots magnetic field strength in arbitrary units versus distance from a VDU measured in centimeters. As shown in the graph, when the emission reduction apparatus 10 is turned off, a typical distance dependence curve of a magnetic field source results. When the emission reduction apparatus 10 is turned on, however, the strength of the magnetic field drops to a negligible value far earlier than the 50 cm standard set by the MPR II standard.

Several technical advantages result from the foregoing. Generally, the emission reduction apparatus 10 of the present invention safeguards users of VDU's from harmful magnetic field emissions and prevent such emissions from interfering with other electrical devices in the vicinity of the VDU. More particularly, by focusing not on the magnetic field emissions at the VDU, but on the strength of such emissions in the vicinity of the user, the present invention enables safe emission levels to be experienced by the user without adversely affecting the operating characteristics of the unit.

Moreover, the present invention provides for the reduction of magnetic emissions from varying types of VDU's. Through the provision of the signature sensor 24 and the flexible nature of the cancellation coil 22 provided by the segments 22b and 22d, the emission reduction apparatus 10 can effectively reduce the emissions of various VDU's having different magnetic field emissions, as well as be physically adaptable to the geometries of various unit models.

The signature sensor 24 also automatically adjusts the field characteristics of the cancellation field to match changes in the characteristics of the magnetic field emitted by the deflection coil, such as those due to changes in the images and colors displayed on the screen 14a.

The emission reduction apparatus 10 also provides a solution to VDU magnetic field emissions that is easy to apply and that does not require the installation of any components within the VDU housing 16. Instead, the entire invention is simply placed around the VDU housing 16.

In addition, through the use of the emission sensor 40 and the adjustment knob 34, the emission reduction apparatus 10 of the present invention can be used to recognize the existence of other magnetic fields in the vicinity of the VDU user and incorporate the existence of those fields in calculating the strength of the necessary cancellation field generated by the cancellation coil 22. Further, the strength of the cancellation field can be manually adjusted by the adjustment knob 34 to ensure proper cancellation as the distance between the VDU and its user changes or as other magnetic field producing devices enter the vicinity.

It should be understood that additional variations may be made to the embodiments of the invention discussed above without departing from the spirit and scope of the present invention. For example, while the emission reduction apparatus 10 has been described as being disposed external to the VDU 12, all of the components of the present invention (except the emission sensor 40) could be disposed within the VDU housing 16. Such an embodiment will be described in connection with FIG. 3, in which the reference numeral 110 designates the emission reduction apparatus of such additional embodiment of the present invention installed within a VDU 112 that is similar to the VDU 12 of the earlier embodiment. The VDU 112 has a housing 116 which includes a rectangular front bezel 116a defining an opening for receiving a screen 114a, a top panel 116b, side panels 116c and 116d, a back panel 116e and a bottom panel 116f. To reduce the intensity of the magnetic field emitted by the deflection coil of the VDU 112, the apparatus 110 includes a single cancellation coil 122 that is functionally equivalent to the cancellation coil 22. The cancellation coil 122 is driven by a signature sensor 124 and electronics 126 mounted to a printed circuit board 128, all contained within the VDU housing 116. The signature sensor 124, electronics 126 and printed circuit board 128 are functionally similar to the signature sensor 24, electronics 26 and printed circuit board 28 of FIG. 1, and receive power from a VDU power supply (not shown). Prior to driving the cancellation coil 122, the gain of the output signal from the signature sensor 124 is adjusted by an adjustment knob 134 extending through the VDU housing 116.

Unlike the previous embodiment, the cancellation coil 122 is disposed within the VDU 112 such that it can be integrated with the VDU 112 during its construction. When viewing the screen 114a, a first segment 122a of the cancellation coil 122 extends around the inside upper left quadrant of the front bezel 116a of the VDU housing 116. At the vertical midpoint of the screen 114a, the first segment 122a turns toward the back panel 116e of the VDU housing 116 and passes through an intersection area 138a located inside the VDU housing 116.

A second segment 122b of the cancellation coil 122 extends from the first segment 122a as it leaves the intersection area 138a. The second segment 122b extends along the side 116c, then to the top panel 116b of the VDU housing 116 to the side 116d where it connects to a third segment 122c of the cancellation coil 122 through an intersection area 138b located inside the VDU housing 116 at the vertical midpoint of the screen 114a. The third segment 122c extends from the side 116d near the vertical midpoint of the screen 114a and travels around the inside bottom half of the front bezel 116a. At the vertical midpoint of the screen 114a, the third segment 122c turns toward the back panel 116e of the VDU housing 116 and passes through the intersection area 138a to orient a portion of the third segment into a generally horizontal position along the side 116c of the VDU housing 116 and parallel to the corresponding portion of the first segment 122a.

A fourth segment 122d of the cancellation coil 122 extends from the third segment 122c as it leaves the intersection area 138a. The fourth segment 122b extends along the side 116c, then along the bottom panel 116f of the VDU housing 116 to the side 116d where it connects to a fifth segment 122e of the cancellation coil 122 through the intersection area 138b at the vertical midpoint of the screen 114a. The fifth segment 122e extends from the side 116d near the vertical midpoint of the screen 114a, crosses over (or under) the third segment 122c of the cancellation coil 122 and travels around the inside upper right quadrant of the front bezel 116a of the VDU housing 116 as viewed when looking at the screen 114a. The fifth segment 122e extends into and is electrically connected to the electronics 126 to complete the electrical circuit of the cancellation coil 122. It is understood that the segments of the cancellation coil 122 are connected to the interior surfaces of the housing 116 through conventional means.

The resulting cancellation coil 122 creates the effect of two half-coils disposed around the screen 114a to produce a magnetic field capable of minimizing the magnetic field emitted by the deflection coil (not shown) of the VDU 112, similar to the first embodiment as shown in FIG. 1, and operates in the same manner as the emission reduction apparatus 10. In such an embodiment, the first, third and fifth segments of the cancellation coil 22 would be disposed adjacent to the inside surface of the front bezel 16a, with the remaining segments of the cancellation coil 22 adjacent the inside surfaces of the other panels of the VDU housing 16. It should be noted that the cancellation coil 22 or 122 can also be silkscreened onto either the interior or exterior of the VDU housing 16 or 116. Further, the signature sensor 24 or 124 could be eliminated as the required gain to create the necessary cancelling magnetic field could be preset for each particular VDU model. Moreover, the emission reduction apparatus 110 could receive its power directly from the VDU power source and thus not require the separate power cord 32. Thus, the emission reduction apparatus 10 of the present invention can be retro-fit to an existing VDU or alternatively incorporated within a VDU during manufacturing.

Moreover, the need for the emission sensor 40 can be reduced by marking the adjustment knob 34 with the appropriate settings for maximum magnetic field reduction for standard VDU models. For example, all VDU's of a certain model should require the same gain control to maximize the reduction of emitted magnetic radiation at a certain distance from the VDU, i.e. 50 cm. Thus, the adjustment knob 34 could be marked with settings, i.e. 1 to 10, and the user would be informed of the correct setting for her particular VDU model. The emission sensor 40 could still be used with such an embodiment for minor adjustments to the cancellation field strength when the user is not 50 cm from the VDU or there are other magnetic field sources in the vicinity.

Alternatively, the feedback provided by the emission sensor 40 could be electronically fed to the electronics 26 to automatically adjust the gain of the cancellation magnetic field, thereby eliminating the need for the adjustment knob 34. In such an embodiment, the emission sensor 40 could be clipped to the user or placed nearby to provide continuous adjustment controls to the cancellation coil 22.

In addition, the role of the adjustment knob 34 could be replaced by a movable signature sensor 24. For instance, the signature sensor 24 could be slidably attached to the top panel 16b of the VDU housing 16 for movement between the front bezel 16a and the back panel 16e. The gain of the cancellation magnetic field would be adjusted by sliding the signature sensor 24 to a position of stronger or weaker deflection coil magnetic field strength.

It will also be recognized by those of ordinary skill in the art that the techniques described herein to reduce the intensity of magnetic field emissions from VDU's are equally applicable to other types of devices which emit magnetic radiation. The key, for VDU's and other devices, is to appropriately shape the cancellation coil to generate a cancelling magnetic field that mimics the shape of the magnetic field in the vicinity of the user or otherwise of interest. There are likely various shapes in which that the cancellation coil for any particular device can be configured, so long as it generates a cancelling magnetic field that mimics the shape of the field being cancelled.

Although various preferred embodiments of the present invention have been shown and described, a latitude of modification, change and substitution is intended in the foregoing disclosure, and in certain instances some features of the invention will be employed without a corresponding use of other features. Accordingly, it is appropriate that the appended claims be construed broadly and in a manner consistent with the scope of the invention.

What is claimed is:

1. An apparatus for reducing magnetic field intensity at a predetermined location spaced from a video display unit having a screen, said field emanating from said video display unit, comprising:

an electronics housing adjacent said unit;

a generally rectangular frame connected to said housing and extending adjacent said screen, said frame having a channel formed therein;

a cancellation coil extending from said housing comprising:
      a first segment extending from said housing into said channel around a first quadrant of said screen to a first vertical midpoint of said frame;
      a second segment extending from said first segment around said unit to a second vertical midpoint of said screen;
      a third segment extending from said second segment into said channel around a bottom half of said screen to said first vertical midpoint of said screen;
      a fourth segment extending from said third segment around said unit to said second vertical midpoint of said screen; and
      a fifth segment extending from said fourth segment past said third segment into said channel around a second quadrant of said screen to said housing;

a magnetic field sensor disposed within housing for sensing the signature characteristics of said field; and electronics disposed within said housing and electrically connected to said first and fifth segments of said cancellation coil for driving said first, third and fifth segments with said signature characteristics at a certain gain to generate a cancelling magnetic field at said predetermined location.

2. The apparatus of claim 1 further comprising:

a magnetic field sensor disposed at said predetermined location for measuring magnetic field strength; and means for adjusting said gain in response to readings of said magnetic field sensor disposed at said predetermined location to minimize magnetic field strength at said predetermined location.

3. The apparatus of claim 2 wherein said adjustment means are automatic.

4. The apparatus of claim 1 wherein said second and fourth segments of said cancellation coil are helically wound to minimize magnetic field emissions from said second and fourth segments.

5. The apparatus of claim 1 wherein said predetermined location is adjustable during normal operation of said video display unit.

* * * * *